US010020143B2

(12) United States Patent
Rival et al.

(10) Patent No.: US 10,020,143 B2
(45) Date of Patent: Jul. 10, 2018

(54) ELECTRICAL APPARATUS FOR BREAKING AN ELECTRIC CURRENT IN AIR COMPRISING AN IMPROVED EXTINGUISHING GAS FILTERING DEVICE

(71) Applicant: Schneider Electric Industries SAS, Rueil-Malmaison (FR)

(72) Inventors: Marc Rival, Saint-Ismier (FR); Eric Domejean, Voreppe (FR); Daniel Rota, Vif (FR); Gregoire Brun, Pont de Claix (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 15/448,980

(22) Filed: Mar. 3, 2017

(65) Prior Publication Data
US 2017/0278653 A1 Sep. 28, 2017

(30) Foreign Application Priority Data
Mar. 24, 2016 (FR) .................................... 16 52540

(51) Int. Cl.
*H01H 33/08* (2006.01)
*H01H 33/62* (2006.01)
(Continued)

(52) U.S. Cl.
CPC ......... *H01H 33/08* (2013.01); *B01D 46/0032* (2013.01); *B01D 46/10* (2013.01); *H01H 33/62* (2013.01); *B01D 2275/205* (2013.01)

(58) Field of Classification Search
CPC ........ H01H 33/08; H01H 33/53; H01H 33/62; H01H 33/65; H01H 9/342; B01D 46/0032;
(Continued)

(56) References Cited

U.S. PATENT DOCUMENTS 3,582,966 A * 6/1971 Strobel .................. H01H 9/342
218/149
3,621,169 A * 11/1971 Heft ....................... H01H 33/58
218/152
(Continued)

FOREIGN PATENT DOCUMENTS

EP 0 817 223 B1 1/1998
EP 1 251 533 A1 10/2002
(Continued)

OTHER PUBLICATIONS

French Preliminary Search Report dated Nov. 9, 2016 in French Application 16 52540, filed on Mar. 24, 2016 ( with English Translation of Categories of Cited Documents).

*Primary Examiner* — Renee Luebke
*Assistant Examiner* — William Bolton
(74) *Attorney, Agent, or Firm* — Oblon, McClelland, Maier & Neustadt, L.L.P.

(57) ABSTRACT

An electrical apparatus for breaking an electric current includes an electrical arc extinguishing chamber, for extinguishing an electrical arc formed on the separation of electric contacts, provided with an extinguishing gas exhaust orifice and an extinguishing gas filtration system, placed at the output of the exhaust orifice and including a filter and a gas diffusor. The gas diffuser includes, superposed between them, a central layer and two outer layers arranged on either side of the central layer. The central layer is provided with first through holes. Each outer layer is provided with second through holes. The first holes are misaligned relative to the second holes so that each of the second holes emerges on a solid portion of the central layer without any first hole.

10 Claims, 4 Drawing Sheets

(51) Int. Cl.
  *B01D 46/10* (2006.01)
  *B01D 46/00* (2006.01)
  *H01H 33/65* (2009.01)

(58) Field of Classification Search
  CPC ............... B01D 46/10; B01D 2275/00; B01D 2275/205
  USPC .................... 218/157, 149, 106, 35; 335/201
  See application file for complete search history.

(56) References Cited

U.S. PATENT DOCUMENTS

| | | | |
|---|---|---|---|
| 6,248,971 B1 | 6/2001 | Morel et al. | |
| 7,176,771 B2* | 2/2007 | Faber ..................... | H01H 9/342 335/201 |
| 7,488,915 B2* | 2/2009 | Pollitt .................... | H01H 9/342 218/149 |
| 7,674,996 B2* | 3/2010 | Shea ...................... | H01H 9/302 218/34 |
| 7,705,263 B2* | 4/2010 | Rane ....................... | H01H 9/34 218/149 |
| 2006/0062341 A1 | 3/2008 | Bach et al. | |
| 2010/0170876 A1* | 7/2010 | Bach ...................... | H01H 9/342 218/157 |
| 2015/0136740 A1* | 5/2015 | Afshari .................. | H01H 33/08 218/149 |

FOREIGN PATENT DOCUMENTS

EP  1 298 687 A2  4/2003
FR  2 778 788 A1  11/1999

\* cited by examiner

ELECTRICAL APPARATUS FOR BREAKING AN ELECTRIC CURRENT IN AIR COMPRISING AN IMPROVED EXTINGUISHING GAS FILTERING DEVICE

BACKGROUND OF THE INVENTION

Field of the Invention

The present invention relates to an electrical apparatus for breaking an electric current in air, such as a circuit-breaker or a contactor, comprising an improved extinguishing gas filtering device.

Description of the Related Art

In a known manner, electrical apparatuses, such as circuit-breakers or contactors, permit the interruption of the circulation of an electric current in an electric circuit, such as a domestic or industrial distribution system. Typically, these devices incorporate separable electrical contacts, connected to terminals for the input and output of an electric current. These electrical contacts are selectively moveable between a closed position, in which they permit an electric current to flow between the terminals and, alternatively, an open position in which they are mutually spaced, thereby preventing the flow of said electric current.

It is specifically known that, as these electrical contacts are moved towards their open position in the presence of an electric current, an electrical arc can be generated between these two electrical contacts. This electrical arc ionizes the ambient air in the device, thereby generating gases, described as extinguishing gases, which are then discharged to the exterior of the device. The electrical arc is then extinguished by an arc-extinguishing chamber in the device, in order to interrupt the flow of electric current. Extinguishing gases have a high temperature, typically in excess of 4000° C., and contain particles such as soot or metal particles in suspension, which generally originate from the partial melting of internal constituents of the device, in response to the action of the electrical arc.

Extinguishing gases must therefore be cooled and deionized, using a dedicated filtration system on the device, before being discharged to the exterior of the device. This permits the prevention of any loop-back of the electrical arc current on the exterior of the device, for example between the input and/or output terminals and external metallic components, associated with the high electrical conductivity of the ionized extinguishing gas. Any such loop-back will result in the formation of a short-circuit, causing an unacceptable and hazardous safety defect.

Known filtration systems generally comprise a filter which incorporates metallic elements. If the extinguishing gas is very hot, or in the event of an electrical arc of high current intensity, there is a risk of loop-back of the electrical arc via the filter.

By way of rectification, EP 1 251 533 A1 describes a gas diffuser, interposed between an exhaust orifice for gases from the arc-extinguishing chamber and an extinguishing gas filter. The function of the gas diffuser is to permit the passage, towards the filter, of extinguishing gases originating from the arc-extinguishing chamber, and to prevent the passage of an electric current in the direction of the filter from the arc-extinguishing chamber.

However, this gas diffuser does not provide complete satisfaction, where it is used in industrially rated electrical devices with a high breaking capacity. By "high breaking capacity", it is understood that the short-circuit breaking current is equal to or greater than 50 kA. As a result of the high intensity of electric currents, the diffuser is unable to prevent the loop-back of electric current in the extinguishing gas which flows therein. Its use therefore entails a risk of occurrence of a fault, either by way of an external loop-back, in which an electrical arc is formed between the terminals of the electrical apparatus and external components, or by way of internal loop-back, in which an electrical arc passes through the filter and short-circuits the splitters in the arc-extinguishing chamber. This poses a substantial hazard to users, or to the electric circuit in which the electrical apparatus is employed. Moreover, it is difficult to modify the dimensions of this diffuser, for example in the interests of increasing the length of the trajectory of the extinguishing gas circulating therein, as a result of space constraints which restrict the incorporation of the gas diffuser into the electrical apparatus.

BRIEF SUMMARY OF THE INVENTION

The invention is more specifically intended to rectify these drawbacks, by proposing an electrical apparatus for breaking an electric current in air having a system for the filtration of extinguishing gases incorporating a gas diffuser, which provides more effective protection against the risk of the loop-back of the arc current into the filter, whilst maintaining satisfactory mechanical properties.

To this end, the invention relates to an electrical apparatus for breaking an electric current, comprising:
- two separable electrical contacts, connected to terminals for the input and output of an electric current;
- an electrical arc-extinguishing chamber, for extinguishing an electrical arc formed on the separation of the electric contacts, wherein this arc-extinguishing chamber is provided with an extinguishing gas exhaust orifice,
- an extinguishing gas filtration system, placed at the output of the exhaust orifice and comprising a filter and a gas diffuser of electrically insulating material construction, wherein the gas diffuser is interposed between the exhaust orifice and the filter.

The gas diffuser comprises, superposed between them, a central layer and two outer layers arranged on either side of the central layer, the central layer being provided with first through holes, each outer layer being provided with second through holes, the first holes being misaligned relative to the second holes, so that each of the second holes emerges on a solid portion of the central layer without any first hole.

By means of the invention, the three-layered structure of the gas diffuser and the arrangement of the first and second through holes permit the elongation of the trajectory followed by the extinguishing gas upon the expulsion thereof from the arc-extinguishing chamber in the direction of the filter. This limits the risk of loop-back of the electrical arc at the output of the diffuser, where the flux of extinguishing gas is substantial or is highly ionized. Moreover, the three-layered structure provides a highly compact arrangement, and ensures the sufficient rigidity and mechanical withstand of the diffuser to permit the resistance thereof to mechanical stresses exerted by the extinguishing gas flux upon the ejection thereof from the arc-extinguishing chamber, due to the high pressure thereof.

According to advantageous, but not mandatory aspects of the invention, an electrical apparatus of this type can incorporate one or more of the following characteristics, in any technically permissible combination:

One or other of the central layer, on the one hand, and the outer layers, on the other hand, comprises a rigid plate of a plastic material, whereas the other of the central layer, on the one hand, and the outer layers, on the other hand, comprises a plate of a synthetic material incorporating aromatic polyamide fibres.

The central layer comprises a rigid plate of a plastic material, whereas the outer layers each comprise a plate of a synthetic material incorporating aromatic polyamide fibres.

The outer layers are interconnected by means of a flexible connector.

The rigid plate of a plastic material, on at least one of its surfaces, incorporates spacer pads which project in relation to said surface, in order to maintain the synthetic material plate adjacent to this surface at a predetermined distance from the rigid plate, with the gas diffuser in an assembled configuration.

The first holes have a lozenge-shaped configuration, with the sides curving inwards towards the centre of the lozenge.

Each of the outer layers has a porosity ranging from 10% to 40%, and preferably from 15% to 30%.

The first holes are arranged in a staggered pattern in relation to the second holes.

The outer layers are identical.

BRIEF DESCRIPTION OF THE SEVERAL VIEWS OF THE DRAWINGS

Understanding of the invention will be enhanced, and other advantages thereof will be further clarified by the following description of one form of embodiment of an electrical apparatus, which is provided by way of an example only, and presented with reference to the attached drawings, in which.

DETAILED DESCRIPTION OF THE INVENTION

Figure 1:
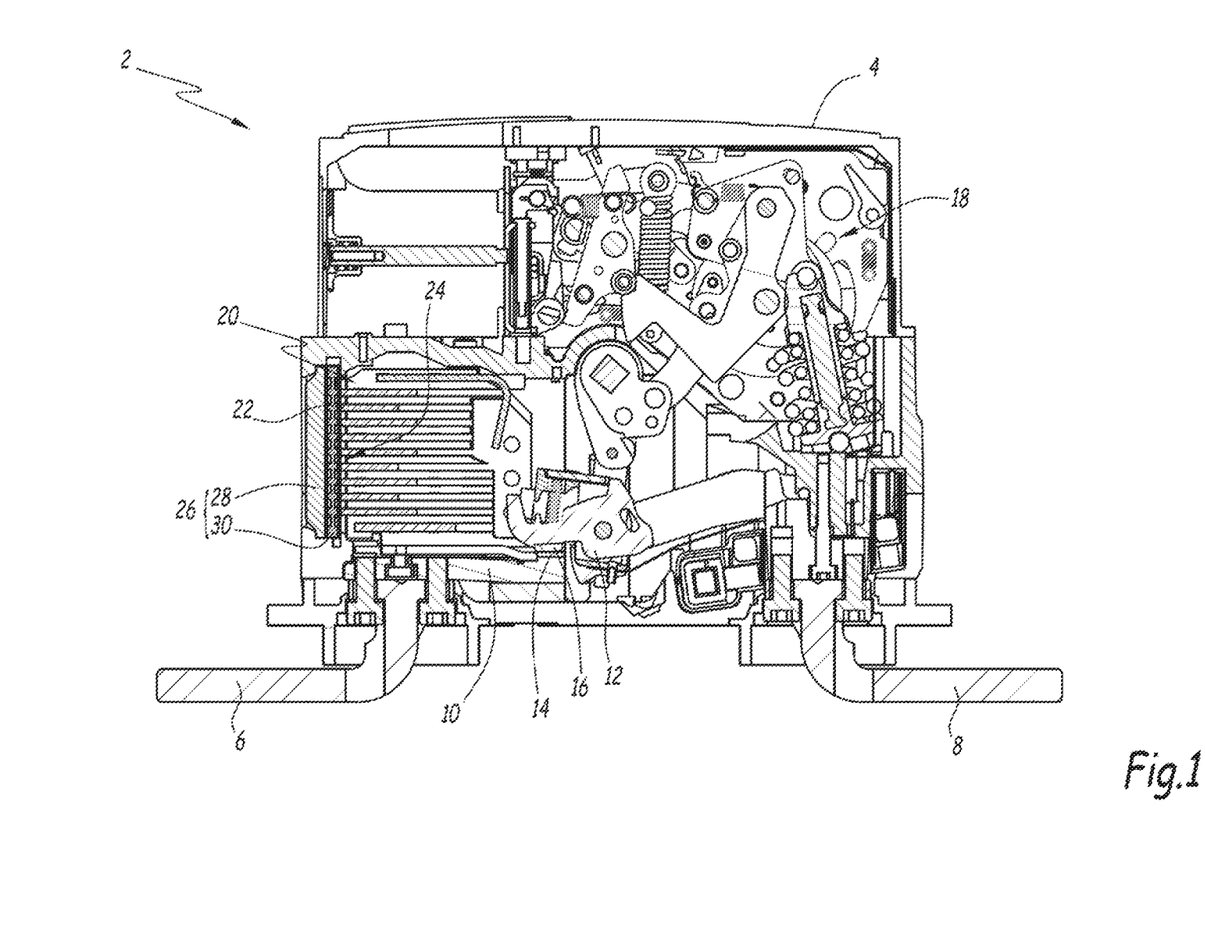
FIG. 1 shows a schematic representation, in a longitudinal section, of an electrical apparatus for breaking an electric current, according to one form of embodiment of the invention.

FIG. 1 shows an electrical apparatus 2 for breaking an electric current, which is designed for use in an electric circuit, in order to permit the interruption of an electric current supply in said electric circuit, for example in response to a control signal, or upon the detection of a functional anomaly, such as a short-circuit or an overcurrent.

In this example, the electrical apparatus 2 is a low-voltage direct current circuit-breaker which is rated, for example, for an electric voltage of 415 V and for electric currents of intensity exceeding 630 A. The short-circuit breaking current on this circuit-breaker is equal to or greater than 70 kA. As a variant, this circuit-breaker is of the alternating current type.

The electrical apparatus 2 comprises a housing 4 and input 6 and output terminals 8 for an electric current which are designed to connect the electrical apparatus 2 to an electric circuit, for example to the tie buses of an electric switchboard. The terminals 6 and 8 are formed of an electrically conductive material, such as copper.

The electrical apparatus 2 also comprises separable electrical contacts 10 and 12, each of which carries a respective contact pad or contact disc 14, 16, connected respectively to the input 6 and output terminals 8. The contact pads 14 and 16 are formed of an electrically conductive material, such as copper.

The electrical contacts 10 and 12 are mutually moveable, selectively and reversibly, between the open and closed positions.

In the closed position, the contact pads 14 and 16 of the electrical contacts 10 and 12 are in direct mutual contact, thus permitting the flow of an electric current between the input terminals 6 and 8.

In the open position, the contact pads 14 and 16 are mutually spaced, for example at a distance equal to or greater than 5 mm or 10 mm. In the absence of an electrical arc between the contact pads 14 and 16, the flow of electric current between the terminals 6 and 8 is prevented.

The electrical apparatus 2 also comprises a displacement mechanism 18, which is configured for the mutual displacement of the separable electric contacts 10 and 12 between their open and closed positions, for example in response to the detection of an abnormal situation, such as an electric overcurrent. Displacement mechanisms 18 of this type are well known, and will not be described in greater detail here. In this case, the electrical contact 10 is fixed in relation to the housing 4, and only the electrical contact 12 is designed to be moved by the dsplacement mechanism 18.

In a known manner, where the contacts 10 and 12 are mutually separated from their closed position to their open position while an electric current is flowing between the terminals 6 and 8, an electrical arc may be formed between the contact pads 14 and 16. An electrical arc of this type permits the flow of current between the terminals 6 and 8 and must be cleared, i.e. extinguished, in order to interrupt the flow of current. In this case, the interior of the housing 4 is air-filled.

To this end, the electrical apparatus 2 incorporates a quenching chamber 20 for an electrical arc. The quenching chamber 20 is arranged on the interior of the housing 4, facing the contact pads 14 and 16, in order to receive an electrical arc upon the formation thereof. The quenching chamber 20 comprises a stack of arc splitter plates 22, formed of a metallic material and configured for the extinction of such an electrical arc, for example by arc splitting.

The quenching chamber 20 incorporates a gas exhaust orifice 24, which discharges to the exterior of the housing 4.

In a known manner, the occurrence of an electrical arc between the contacts 14 and 16 ionizes and strongly heats the ambient air. This results in the formation of a gas, described as an "extinguishing gas", which has a high temperature, typically in excess of 5000° C.

Upon the formation of an electrical arc, this extinguishing gas is discharged to the exterior of the quenching chamber 20, and consequently of the housing 4, via the exhaust orifice 24.

This extinguishing gas must be cooled and decontaminated before being discharged to the exterior, for reasons of safety. To this end, the electrical apparatus 2 comprises an extinguishing gas filtering system 26, arranged at the outlet of the exhaust orifice 24.

Figure 2:
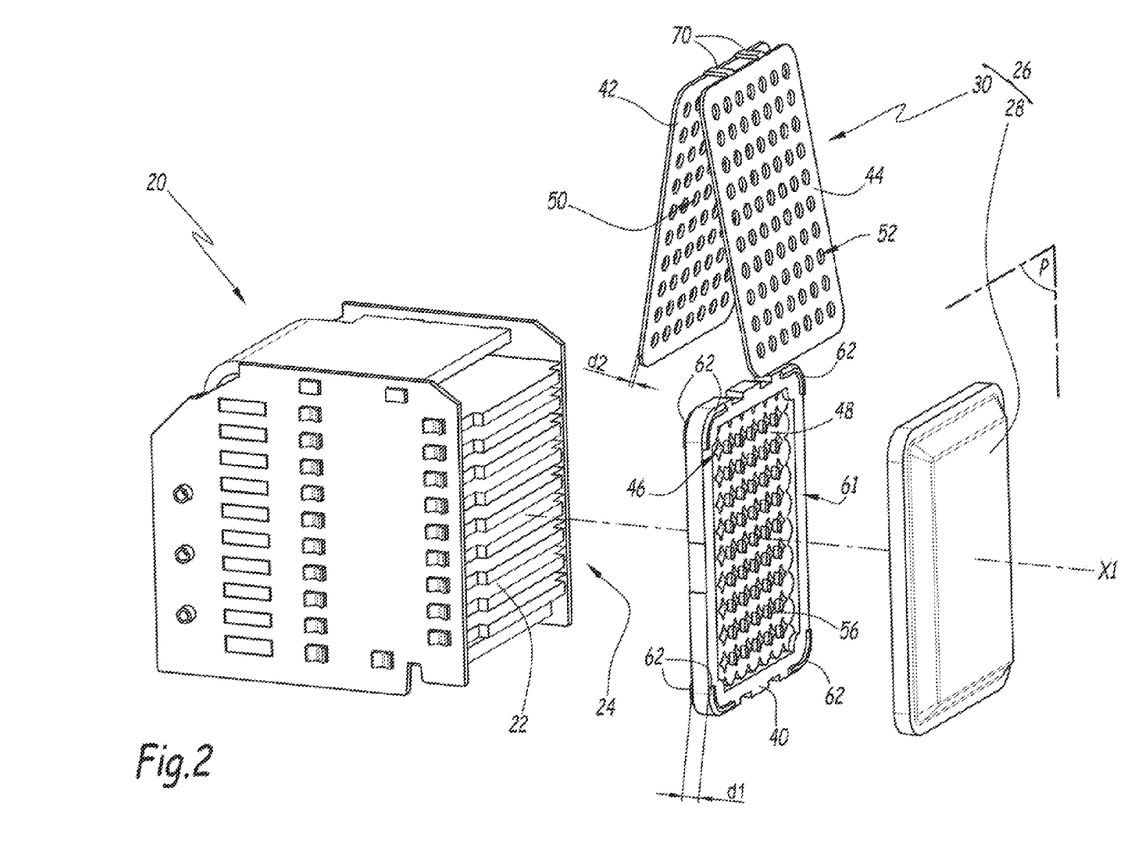
FIG. 2 shows a schematic representation, in an exploded view, of an extinguishing gas filtering system in the electrical apparatus represented in FIG. 1.

As illustrated in FIG. 2, the filtering system 26 comprises a filter 28 and a gas diffuser 30. In this case, the filtering system 26 is illustrated in an exploded view. With the filtering system 26 in an installed configuration, the gas diffuser 30 is in direct contact with the exhaust orifice 24 and with the filter 28.

The function of the filter 28 is the cooling of the extinguishing gas to a temperature which will permit the release thereof to the exterior of the housing 4, for example below 2000° C. The filter 28 also decontaminates the extinguishing gas, such that its concentration of electrically conductive particles is sufficiently low to eliminate any risk of a short-circuit associated with the loop-back of current on the exterior of the housing 4.

In this case, the filter 28 comprises a porous screen, formed by the overlaying of a number of metallic fabrics, woven in a mutually parallel direction. The metallic fabrics are arranged with a progressively decreasing mesh size, from the exhaust orifice 24 towards the exterior of the housing 4. An example of a filter of this type is described in EP 0 817 223 B1.

In this case, the filter 28 extends in a geometric plane P. Here, this plane P is parallel to the exhaust orifice 24. Extinguishing gases are discharged from the quenching chamber 20 in a direction which is essentially perpendicular to the plane P. "X1" designates a fixed axis of the electrical apparatus 2 which is perpendicular to the plane P.

The gas diffuser 30 is interposed between the exhaust orifice 24 and the filter 28, such that extinguishing gases discharged via the exhaust orifice 24 are forced to flow through the gas diffuser 30 towards the filter 28. In this case, the extinguishing gases cannot leave the quenching chamber 20 other than via the exhaust orifice 24.

The function of the gas diffuser 30 is to permit the passage of the extinguishing gas from the quenching chamber 20 in the direction of the filter 28, whilst presenting the passage of an electric current into the filter 28. As the filter 28 is of metallic material construction, it is electrically conductive. There is consequently a risk of loop-back of electric current to the interior of the filter 28.

Figure 3:
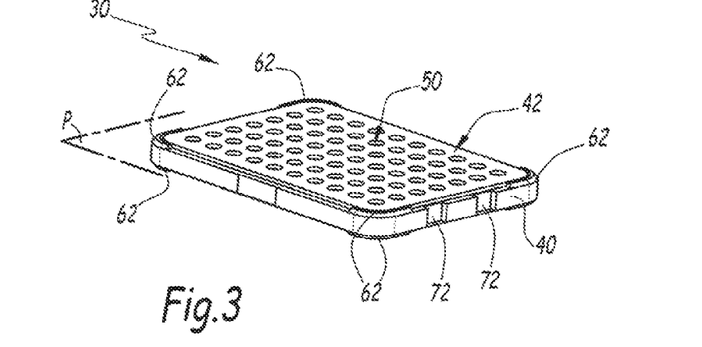
FIG. 3 shows a schematic representation, in a perspective view, of a gas diffuser in the extinguishing gas filtering system represented in FIG. 2, in an assembled configuration.
Figure 4:
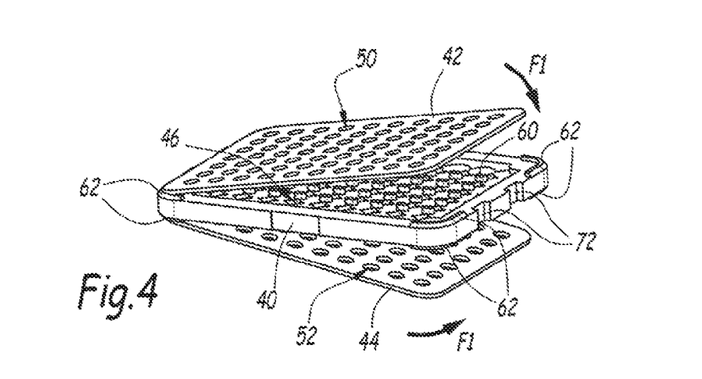
FIGS. 4 and 5 show schematic representations, in a perspective view, of the gas diffuser represented in FIG. 3, in a dismantled configuration.
Figure 5:
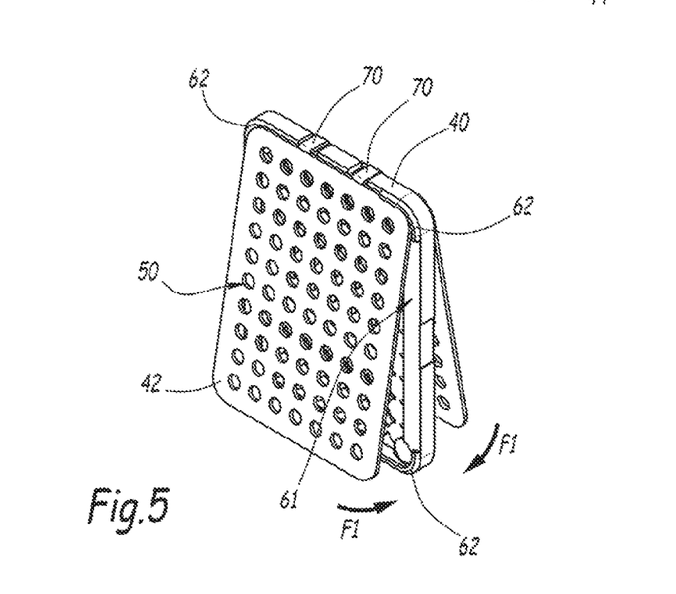

FIGS. 3, 4 and 5 represent one form of embodiment of the gas diffuser 30, respectively in one assembled configuration and in two dismantled configurations.

The gas diffuser 30 comprises a central layer 40 and two outer layers 42 and 44, arranged on either side of the central layer 40. The central layer 40 and the outer layers 42 and 44 are mutually superposed, in a mutually parallel direction. Advantageously, the outer layers 42 and 44 are secured to the central layer 40.

The central layer 40 and the outer layers 42, 44 are of planar form. Hereinafter, the "principal plane" of a layer refers to the plane in which said layer extends. The "principal surfaces" of a layer are the surfaces of said layer which are parallel to the principal plane of the layer concerned. In this case, the layers 40, 42 and 44 are arranged in parallel to the geometric plane P.

The layers 40, 42 and 44 are each of quadrilateral form, for example a rectangular parallelepiped. By way of an illustrative example, the dimensions of the central layer 40 are 55 mm in length and 40 mm in width. Each layer 42, 44 has dimensions of 54 mm in length and 40 mm in width. These dimensions are measured parallel to the plane P.

For example, the layer 42 is arranged on an upstream side of the central layer 40, in contact with the exhaust orifice 24. The layer 44 is arranged on a downstream side of the layer 40, in contact with the filter 28. The terms "upstream" and "downstream" are defined here with reference to the direction of flow of the extinguishing gas, from the exhaust orifice 24 towards the filter 28.

The central layer 40 incorporates first through holes 46 which are arranged on opposite sides of said layer 40, parallel to the principal plane. The holes 46 pass through the central layer 40 in an essentially perpendicular direction to the principal plane of the layer 40.

In this case, the central layer 40 is a solid plate, in which the holes 46 are arranged. Reference number 48 describes the solid portions of the central layer 40, which features no holes 46.

In this example, the first holes 46 in the central layer 40 are mutually identical, and are of the same dimensions. These first holes 46 are arranged in a regular pattern on the surface of the central layer 40. For example, these first holes 46 are arranged in rows and in rectilinear and mutually perpendicular columns. In this case, the holes 46 are arranged in six rows and in nine mutually perpendicular columns.

Figure 6:
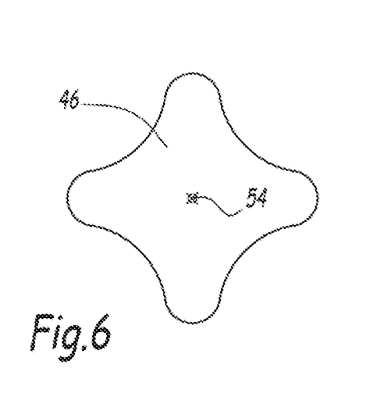
FIG. 6 shows a schematic representation, in a frontal view, of a through hole arranged in a central layer of the gas diffuser represented in FIGS. 2-4.

Advantageously, each first hole 46 has a regular lozenge shape, the sides of which curve inwards towards the centre 54 of the lozenge, as illustrated in FIG. 6. This lozenge shape advantageously delivers a high degree of porosity in the central layer 40, whilst sufficiently restricting the risk of a loop-back of electric current upon the passage of the extinguishing gas. As a variant, other shapes are possible, for example an ellipse, a straight-sided lozenge, a straight or curved slot.

Each of the outer layers 42 and 44 incorporates second through holes, designated respectively as 50 and 52. The holes 50 and 52 are arranged on opposite and parallel sides of the principal plane of the outer layer, respectively 42 and 44. The holes 50 and 52 pass through the layer, respectively 42 and 44, in an essentially perpendicular direction to the principal plane of said layer. The holes 50 and 52 are disc-shaped. In this case, the holes 50 and 52 are mutually identical, and are of the same dimensions.

In this example, each of the first holes 46 is cylindrical in shape, with an axis parallel to X1 and of constant cross section over the full thickness of the central layer 40. The same applies to the two holes 50 and 52, vis-à-vis the outer layers 42 and 44.

In this example, the outer layers 42 and 44 are identical. Consequently, only the outer layer 42 is described hereinafter. The full description with reference to the outer layer 42 applies equally to the outer layer 44.

The number and dimensions of the second holes 50 are selected such that the outer layer 42 has a porosity ranging from 10% to 40%, and preferably from 15% to 30%.

As the second holes 50 are of constant diameter over the full thickness of the outer layer 42, the porosity of the layer 42 can be calculated by calculating the surface area of all the second holes 50 carried by said layer 42, divided by the total surface area of one surface of the layer 42.

Advantageously, the porosity of the outer layer 42 is equal to the porosity of the filter 28, within a margin of 20%, or preferably within a margin of 10%. The "porosity of the filter 28" is understood here as the porosity of the woven metallic fabric of the filter 28 which is located at the end of the metallic fabric stack, on the side of the gas diffuser 30. The porosity of such a metallic fabric of the filter 28 is defined, for example, as the surface area of all the mesh openings in said fabric, divided by the total surface area of said fabric. In consideration of the characteristics of metallic fabrics which are typically used to form the filter 28, the porosity of the layer 42 is preferably equal to or greater than 20%, and equal to or lower than 25%.

By way of an illustrative example, the layer 42 has seventy holes 50, each of diameter 3 mm. The total surface area of the holes 50 is equal to 489 mm$^2$, out of a total surface area of the layer 42 equal to 2,160 mm$^2$, giving a porosity of approximately 22.6%.

The excessive reduction of the extinguishing gas flow is thus prevented, together with any excessive obstruction to the discharge thereof outside the electrical apparatus 2 as it passes through the gas diffuser 30.

The holes 50 are mutually spaced in a regular pattern, with a spacing pitch L, in this case equal to 5 mm. The spacing pitch L is measured between the respective geometric centres 56 of two consecutive openings 50, in a parallel direction to the plane P. With the gas diffuser 30 in an assembled configuration, each second hole 50 in the layer 42 is aligned with a corresponding hole 52 in the layer 44.

In the assembled configuration of the gas diffuser 30, where the central layers 40 and the outer layers 42 and 44 are mutually superimposed, the holes 46 are misaligned in relation to the second holes 50 and 52, in a direction parallel to the plane P, such that each of the second holes 50 and 52 emerges onto a solid portion 48 of the central layer 40. Accordingly, the extinguishing gas discharged from the exhaust orifice 24 must be routed on the interior of the gas diffuser 30, between the central layer 40 and the outer layers 42, 44, before it can reach the filter 28.

Figure 7:
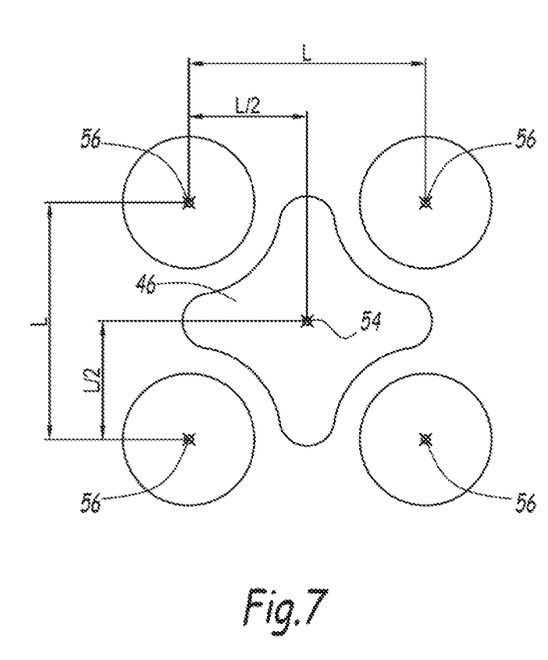
FIG. 7 shows a schematic representation, in a frontal view, of the pattern of the geometric centres of the holes arranged in the layers of the gas diffuser represented in FIGS. 2-5.

In this example, with the gas diffuser 30 in the assembled configuration, the second holes 50 are arranged in a staggered pattern relative to the first holes 46, as illustrated in FIG. 7. More specifically, the orthogonal projection, in the plane P, of the centre 54 of the hole 46 is offset in relation to each orthogonal projection, in the same plane P, of the geometric centre 56 of the holes 50, by a distance equal to L/2, in both perpendicular directions of the plane P.

However, other arrangements are possible, provided that they avoid any overlap between the holes 46 and 50, i.e. the orthogonal geometric projection, in the plane P, of the surface area of each first opening 46, is dissociated from the orthogonal geometric projection, in this same plane P, of each of the second openings 50 and 52.

By way of an illustrative example, the holes 50 are arranged in seven rows and in ten rectilinear and mutually perpendicular columns, respectively parallel to the rows and columns in which the holes 46, as described above, are arranged.

The gas diffuser 30 is an electrical insulator, i.e. is formed of electrically insulating materials. For example, the electrical conductivity of the gas diffuser 30 is at least ten times lower, and preferably at least one hundred times lower than the electrical conductivity of the filter 28.

One or other of the central layer 40 on the one hand, and the outer layers 42, 44 on the other hand, comprises a rigid plate of a plastic material, whereas the other of the central layer 40, on the one hand, and the outer layers 42, 44 on the other hand, comprises a plate of a synthetic material incorporating aromatic polyamide fibres, also known as "aramid".

According to a preferred form of embodiment of the invention, the central layer 40 comprises the rigid plastic material. The outer layers 42 and 44 each comprise the plate of the synthetic material incorporating aromatic polyamide fibres.

For example, the central layer 40 is a cast component of a thermosetting plastic material, such as polyester. The layer 42 is a sheet of synthetic paper incorporating heat-calenderized aromatic polyamide fibres, such as meta-phenylene isophtalamide. For example, a sheet of the material marketed by the company "DuPont De Nemours" under the trade name "Nomex® T410" is used.

The central layer 40 has a thickness d1 of less than 5 mm, preferably equal to or less than 2.5 mm, and equal to or greater than 1 mm. The layer 42 has a thickness d2 ranging from 0.5 to 1 mm, preferably within the interval [0.6 mm; 0.8 mm]. The total thickness of the diffuser 3 is thus less than 10 mm, preferably less than 5 mm, and more preferably less than 3 mm. In this case, the thicknesses are measured, for each layer, in a perpendicular direction to the principal plane of said layer. In this case, with the gas diffuser 30 in an assembled configuration, the thicknesses are measured in the axis X1, perpendicular to the plane P.

The selection of a synthetic material of this type ensures the achievement of sufficient mechanical stability for the resistance thereof to the mechanical stresses exerted on the gas diffuser 30 during the passage of the extinguishing gas, associated with the high pressure of the latter. Specifically, this synthetic material ensures the effective withstand of the diffuser to the high temperatures of the extinguishing gas. Firstly, this type of material is a low gas producer. Moreover, the absence of glass-fibre in a synthetic material of this type reduces the risk of the dielectric breakdown of this material upon the passage of the extinguishing gas. By "absence of glass-fibre", it is understood here that the concentration by mass of glass-fibre in this material is equal to or lower than 0.01%, or preferably equal to or lower than 0.001%.

As a result of this structure, the gas diffuser 30 delivers satisfactory performances in terms of protection against the loop-back of current within the filter 28. Its limited thickness provides a highly compact structure, thus rendering it compatible with the dimensional constraints imposed by the structure of the filtering system 26 and by the quenching chamber 20.

This gas diffuser 30 also shows a satisfactory mechanical withstand, due to the presence of at least one rigid plate, and due to the maintenance of the direct contact thereof between the filter 28 and the quenching chamber 20, both of which show a high degree of mechanical rigidity. The gas diffuser 30 is thus capable of resisting the mechanical stresses exerted by the extinguishing gas during the passage thereof.

Advantageously, the central layer 40 comprises, on at least one of its principal surfaces, spacer pads 60 which are designed to maintain one of the outer layers 42 or 44 adjacent to this surface at a predetermined distance from the central layer 40. This prevents the obstruction by the layers 42 and 44 of all or part of the holes 46, for example as a result of strain.

In this example, the spacer pads 60 are arranged on the two opposing upstream and downstream principal surfaces of the layer 40, such that each of the outer layers 42 and 44 is maintained at a predetermined distance. The pads 60 project perpendicularly from each of the principal surfaces. The spacer pads 60 are arranged on solid portions 48 of the central layer 40. In the assembled configuration of the gas diffuser 30, the layers 42 and 44 are in contact with the spacer pads 60, which are distributed over the entire surface area of each of the said surfaces. In this case, the spacer pads 60 are evenly distributed over each of these principal surfaces and are of a cylindrical shape with, for example, a base of oblong design, such as an ellipse.

For example, the layer 40 incorporates, on each of its principal surfaces, an edging 61 which extends over the entire perimeter of said surface, around a central part of the layer 40. The thickness of the layer 40 is greater at the edging 61 than in the central part. The first holes 46 and the spacer pads 60 are arranged exclusively in the central part. Here, the thickness d1 of the layer 40 is measured at the level of said edging 61. The thickness of the spacer pads 60, measured in a direction parallel to the axis X1, is such that there is no resulting over-thickness in relation to the edging 61. Accordingly, in the assembled configuration of the gas diffuser 30, the plates 42 and 44 are, on each surface of the central layer 40, simultaneously in contact with the edging 61 and with the spacer pads 60. In this case, the predetermined distance is not equal to zero. Here, this predetermined distance is measured at the level of the central part, in a perpendicular direction to the plane of the layer 40. In this case, this distance is determined by the thickness of the spacer pads 60.

As a variant, the central layer 40 may incorporate spacer pads 60 on its upstream surface only, i.e. the surface facing the exhaust orifice 24 in the assembled configuration of the electrical apparatus 2. This permits the prevention of strain in the layer 42 upon the passage of the extinguishing gas, associated with the high pressure of the latter.

Advantageously, the outer layers 42 and 44 are interconnected by means of a flexible connector 70. In this case, these connectors 70 are configured in the form of straps, are two in number, and extend between the respective lower edges of the outer layers 42 and 44, arranged in mutual opposition. The flexible connector 70 facilitates the positioning and fitting of the outer layers 42 and 44 on either side of the central layer 40 during stages for the manufacture and assembly of the gas diffuser 30. Advantageously, the layer 40 incorporates notches 72, arranged here on the edging 61, each of which is designed to accommodate a connector 70. The connector 70 is thus seated in the corresponding notch 72 with no resulting over-thickness at the edge of the central layer 40.

Advantageously, the layer 40 incorporates, on each of its principal surfaces, a holding element 62, which is configured to maintain the corresponding outer layer 42 or 44 in a fixed position on the central layer 40, for example by snap-fitting. In this case, the holding elements 62 are arranged to project from the edgings 61 at the four corners of each principal surface of the layer 40.

FIGS. 4 and 5 illustrate an example of the assembly of the gas diffuser 30 into its assembled configuration. The positioning of the outer layers 42 and 44 is firstly ensured by arranging the central layer 40 between the outer layers 42 and 44, such that the connectors 70 are fitted into the notches 72. The outer layers 42 and 44 are then mutually compressed onto the central layer 40, in the direction illustrated by the arrows F1 on FIGS. 4 and 5, until the outer layers 42 and 44 are in full contact with the edgings 61 and with the spacer pads 60 of the central layer 40. The edges of the outer layers 42 and 44 engage with the holding elements 62, which then maintain these layers in a fixed position. In the assembled configuration, each outer layer 42 and 44 is thus maintained at a predetermined distance from the central part of the layer 40.

According to another form of embodiment, the outer layers 42 and 44 each comprise an aforementioned rigid plate of a plastic material, and the central layer 40 comprises the aforementioned plate of a synthetic material, incorporating aromatic polyamide fibres. A diffuser according to this second form of embodiment permits the achievement of acceptable protection against the risk of the loop-back of the electrical arc current within the filter 28, but has the disadvantage of occupying more space than the gas diffuser 30 according to the first form of embodiment. In practice, such a diffuser has a greater overall thickness, as the thickness of the plastic material plates is greater than that of the synthetic material plates. On the grounds of industrial production constraints, the plastic material plate has a thickness equal to or greater than 1 mm or 1.5 mm. The integration of the gas diffuser 30 according to this second form of embodiment within the filtering system 26 and the electrical apparatus 2 is thus rendered more problematic.

According to a variant of this further form of embodiment, the spacer pads 60 are arranged on the rigid plastic material plates of the outer layers 42 and 44, for example only on the surfaces of said plates which face towards the central layer 40.

Many other forms of embodiment are possible. For example, the electrical apparatus 2 may be a contactor, or any other electrical apparatus with a high breaking capacity which is designed to interrupt an electric current in response to a control signal or a predetermined condition, wherein said electrical apparatus comprises a chamber for the quenching of an electrical arc in air which is analogous to the quenching chamber 20.

The filtering system 26 may be different and may comprise, for example, a plurality of filters 28, configured in a mutually serial fluid arrangement. In this case, the gas diffuser 30 is preferably arranged between the exhaust orifice and the first of the filters 28.

The electrical apparatus 2 may be a multi-pole device which is designed, for example, for use in multi-phase electric circuits. It thus comprises, for each, of the electric poles, input and output terminals and a quenching chamber which are separate from those of the remaining electric poles. In this case, a diffuser which is identical to the gas diffuser 30 is incorporated in each gas filtering system which is associated with each of these quenching chambers.

The connectors 70 can be omitted, as can the notches 72, specifically where the layers 42 and 44 are formed by the rigid plate of a plastic material.

The holding elements 62 can be omitted. In this case, the layers 42 and 44 are bonded to the central layer 40 by means of gluing.

The forms of embodiment and variants envisaged above can be mutually combined to produce new forms of embodiment.

The invention claimed is:

1. An electrical apparatus for breaking an electric current, comprising:
    two separable electrical contacts connected to terminals for an input and output of the electric current;
    an electrical arc-extinguishing chamber for extinguishing an electrical arc formed on a separation of the electric contacts, wherein said arc-extinguishing chamber is provided with an extinguishing gas exhaust orifice; and
    an extinguishing gas filtration system placed at an output of the exhaust orifice and comprising a filter and a gas diffuser of electrically insulating material construction, wherein the gas diffuser is interposed between the exhaust orifice and the filter;
    wherein the gas diffuser comprises, superposed between them, a central layer and two outer layers arranged on either side of the central layer, the central layer being provided with first through holes, each outer layer being provided with second through holes, the first holes being misaligned relative to the second holes, so that each of the second holes emerges on a solid portion of the central layer without any first hole.

2. The electrical apparatus according to claim 1, wherein one or another of the central layer and the outer layers comprises a rigid plate of a plastic material, whereas the another of the central layer and the outer layers comprises a plate of a synthetic material incorporating aromatic polyamide fibers.

3. The electrical apparatus according to claim 2, wherein the central layer comprises the rigid plate of the plastic material, whereas the outer layers each comprise the plate of the synthetic material incorporating aromatic polyamide fibers.

4. The electrical apparatus according to claim 3, wherein the outer layers are interconnected by a flexible connector.

5. The electrical apparatus according to claim 2, wherein at least one surface of the rigid plate of the plastic material incorporates spacer pads which project in relation to said surface, in order to maintain the synthetic material plate adjacent to said surface at a predetermined distance from the rigid plate, with the gas diffuser in an assembled configuration.

6. The electrical apparatus according to claim 1, wherein the first holes have a lozenge-shaped configuration, with sides curving inwards towards a center of the lozenge.

7. The electrical apparatus according to claim 1, wherein each of the outer layers has a porosity ranging from 10% to 40%.

8. The electrical apparatus according to claim 1, wherein the first holes are arranged in a staggered pattern in relation to the second holes.

9. The electrical apparatus according to claim 1, wherein the outer layers are identical.

10. The electrical apparatus according to claim 7, wherein the porosity of each of the outer layers ranges from 15% to 30%.

* * * * *

UNITED STATES PATENT AND TRADEMARK OFFICE
CERTIFICATE OF CORRECTION

PATENT NO. : 10,020,143 B2
APPLICATION NO. : 15/448980
DATED : July 10, 2018
INVENTOR(S) : Marc Rival et al.

Page 1 of 1

It is certified that error appears in the above-identified patent and that said Letters Patent is hereby corrected as shown below:

On the Title Page

Abstract (57), Line 7, change "gas diffusor" to --gas diffuser--; and

In the Specification

Column 4, Line 43, change "dsplacement mechanism" to --displacement mechanism--.

Signed and Sealed this
Fifth Day of November, 2019

Andrei Iancu
*Director of the United States Patent and Trademark Office*